United States Patent [19]

Manson et al.

[11] Patent Number: 5,454,510
[45] Date of Patent: Oct. 3, 1995

[54] THREE BUTTON APPROACH FOR REMOTE CONTROL AIR CONDITIONER DELAYED MODES

[75] Inventors: Larry J. Manson, Baroda Township, Berrien County, Mich.; Jerome D. Hurner, Olive Township, St. Joseph County, Ind.; John K. Paustian, Millburg, Mich.

[73] Assignee: Whirlpool Corporation, Benton Harbor, Mich.

[21] Appl. No.: 222,733

[22] Filed: Apr. 1, 1994

[51] Int. Cl.[6] .................................................. G05D 23/00
[52] U.S. Cl. ................................ 236/46; 165/12; 236/51
[58] Field of Search ............... 165/12; 236/518, 236/46 R

[56] References Cited

U.S. PATENT DOCUMENTS

| | | |
|---|---|---|
| 4,384,461 | 5/1983 | Kurtz ........................................ 62/157 |
| 4,621,336 | 11/1986 | Brown ..................................... 236/46 R |
| 4,819,714 | 4/1989 | Otsuka et al. ............................ 165/12 |
| 4,881,686 | 11/1989 | Mehta ..................................... 236/46 R |
| 5,012,973 | 5/1991 | Dick et al. .............................. 236/46 R |
| 5,107,918 | 4/1992 | McFarlane et al. ...................... 165/12 |
| 5,113,665 | 5/1992 | Katsuki ................................ 236/51 X |
| 5,224,353 | 7/1993 | Nagasawa ............................. 236/51 X |

*Primary Examiner*—William E. Wayner
*Attorney, Agent, or Firm*—Baker & Daniels

[57] ABSTRACT

A method and apparatus for controlling operation of a delayed operation cycle of a room air conditioner. A program set key is selected and activated to allow a user to input the delayed operation modes to the air conditioner. The user then enters the activation time of the delayed operation mode along with possible other operation parameters. The program set key is then again activated to complete the delayed operation program. A start key and program stop key respectively enable or disable the previously entered delayed operation parameters. A remote control including a microprocessor is utilized to process the entered delayed operation cycle.

18 Claims, 4 Drawing Sheets

THREE BUTTON APPROACH FOR REMOTE CONTROL AIR CONDITIONER DELAYED MODES

MICROFICHE APPENDIX

This application includes a microfiche appendix having 78 frames.

BACKGROUND OF THE INVENTION

The present invention relates to the control of room air conditioner units, and more particularly, to a remote control system having a delayed operation mode for the control of an air conditioning unit.

Room air conditioning units provide an alternative to central air conditioning systems in apartment buildings, offices and homes where it is either impractical or prohibitively expensive to install them. An important consideration of the purchase and installation of an air conditioning unit is the cost of operating the unit. An inefficiently operated air conditioner can result in substantial energy costs.

The remote control units for control of air conditioners have been developed successfully. Not only does a remote control provide the operator with freedom of movement while controlling the room air conditioner, but further provides easy access to the controls. Specifically, prior controls for a room air conditioner unit were normally placed on the surface of the unit, while the unit was placed at a high, low, or awkward position in the room. A remote control unit, therefore, does not require the operator to reach up or bend down to operate the unit. Further, remote controls do not require space on the surface of the air conditioner.

A problem in air conditioner operation is controlling different modes of operation on a delayed basis. For example, the user may wish a room to be cool by the time he or she arrives home from work. In this instance, some type of delayed setting is necessary so that the room air conditioner does not operate all day just to ensure a cool room upon arrival. Additionally, the operator may wish to control and program alternative modes and times of operation.

Remote control of room air conditioners is disclosed in U.S. Pat. No. 5,113,665. This remote control unit is utilized for operating a test run of the air conditioner. A wireless remote controller utilizes a microprocessor for transmitting operating data to an air conditioner and a receiving circuit for receiving data from the air conditioner relating to its operation. No means is provided to allow the user to pre-program a room air conditioner to start a cooling cycle at some future time. This type of remote controller further does not allow the user to set various operation parameters independent from the current operational mode of the room air conditioner.

U.S. Pat. No. 5,012,973 discloses a programmable thermostat to store particular programs and temperatures. This programmable thermostat does not allow input of particular program settings to vary operational parameters of the room air conditioner other than temperature.

U.S. Pat. No. 4,384,461 relates to another programmable thermostat control for use with an air conditioner or heat pump unit. This control utilizes programmable time counters to control on/off modes of the unit. No remote control is utilized in which programming by the operator may be retained in memory for later retrieval and use.

The present invention is directed to overcome the aforementioned problems associated with remote control of room air conditioners, where it is desired to provide a user friendly interface for selection of delayed operation modes, without interfering with the current mode of the room air conditioner.

SUMMARY OF THE INVENTION

The present invention provides an electronic control for a room air conditioner including a remote control unit adapted to be located remote from the room air conditioner in wireless communication therewith. The remote control permits the user to set various parameters for delayed operation of the room air conditioner that may be different from a current mode of operation.

The present invention also provides for enabling or disabling these delayed modes of operation such that, when disabled, the delayed mode settings are retained in memory for subsequent use.

The present invention includes a three button control method for delayed cycle input and operation of two air conditioning cycles described hereinafter.

An auto start cycle is utilized for delayed mode operation to allow the user to preprogram the room air conditioner for operation at some future time. An auto start set key initiates programming of the remote control through which the user enters a starting time, temperature, fan speed and operating mode of the air conditioner. Keys located on the remote control enable or disable the preprogrammed auto start cycle without removing the program from memory.

Another feature of the remote control is that of providing for automatic shutdown of the room air conditioner (i.e., auto stop). Auto stop allows the user to preprogram the room air conditioner to cause a cooling cycle to end at a future time. An additional feature of the controller is that the remote control automatically adds five minutes to the auto stop time if it is set to the same time as the auto start feature. This eliminates the possibility of conflicting delay operation modes of the room air conditioner.

Accordingly, one advantage of the present invention is that the remote control unit allows a user to set various operating parameters of the room air conditioner that may be different from the current mode of operation. This provides a user friendly interface to allow flexible selection of current or delayed operation of the room air conditioner without requiring the user to change the current operating mode to match the delayed mode programming.

Another advantage of the present invention is that the delayed modes of operation may be enabled or disabled without loss of the previously entered delay program. This allows a particular delay program to be enabled or disabled without reselecting favored or required air conditioner operation parameters each time the user wants to enable the delay program.

Still another advantage of the present invention is the ease of use of the remote with its inherent flexibility and versatility. The present invention allows delayed modes and current mode uses to be multiplexed, therefore requiring only one set of parameter selecting switches.

The invention, in one form thereof, provides a method for controlling a room air conditioner with a remote control. The remote control includes a processor, an input means with a plurality of keys operatively associated with the processor, and a wireless transmission means operatively associated with the processor for sending an output signal to the room air conditioner. The method includes selecting a first key to signal the processor to process further selected signals from the keys into either a delay start sequence or delay stop sequence, then selecting further keys to input selected operational parameters of the delay sequence into the processor. The first key is again selected to signal the processor to cease processing further inputs into the delay sequence. The inputed operational parameters are then processed into an output signal and transmitted with the wireless transmission means to the room air conditioner.

The invention in another form provides a method of controlling a room air conditioner with a remote control unit including input means having a plurality of keys for selecting the operational parameters of the room air conditioner and for generating corresponding selection signals. A processing means is included for processing the selection signals into a plurality of output signals. The output signals including a delay start sequence with an encoded start time and a delay stop sequence with an encoded stop time for delay control of the room air conditioner. A memory means is connected with the processing means for maintaining, in memory, the delay start and stop sequences regardless of the operating mode of the room air conditioner while a wireless communication means, associated with the processing means, is used to transmit the output signals to the air conditioner. The method includes selecting a key on the input to enable the processor to process further inputted signals into either a delay start sequence or delay stop sequence, selecting additional keys to input air conditioner parameters to the processor. The parameters are then processed by the processor into an output signal. A second key is then selected to enable the delay program previously inputted and to transmit the output signal via the wireless communication means to the room air conditioner.

The invention, in yet another form, provides an electronic control for use with a room air conditioner, comprising a remote control unit adapted to be located remote from the room air conditioner and a room air conditioner control unit. The remote control unit includes an input means for selecting operational parameters of the air conditioner and for generating selection signals. A processing means is included for processing the selection signals into a plurality of output signals, the output signals include a delay start sequence with an encoded start time and a delay stop sequence with an encoded stop time. Memory means, operably associated with the processor means, is used for maintaining in memory the delay start sequence and delay stop sequence which are created, regardless of the operating mode of the room air conditioner. Wireless communication means are included for sending the output signals to the room air conditioner control unit. The room air conditioner control unit includes second wireless communication means for receiving the output signals, and switch means for controlling the room air conditioner based on the output signal.

The invention, in accordance with another embodiment thereof, provides a remote control for a room air conditioner. The remote control includes a processor means for creating an output signal, a display means operatively associated with the processor means for displaying the operating states of the processor, and an input means operatively associated with the processor means for inputting operator selections to the processor means to control air conditioner operation. The input means additionally includes a program-set key, a program-on key, and a program-off key. The program-set key enables the user to input selected parameters into the processor means, while the program-on key enables one of the start or stop delay sequences. The program-off key disables either the start sequence or stop sequence without removing them from the memory of the processor.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

Figure 1:
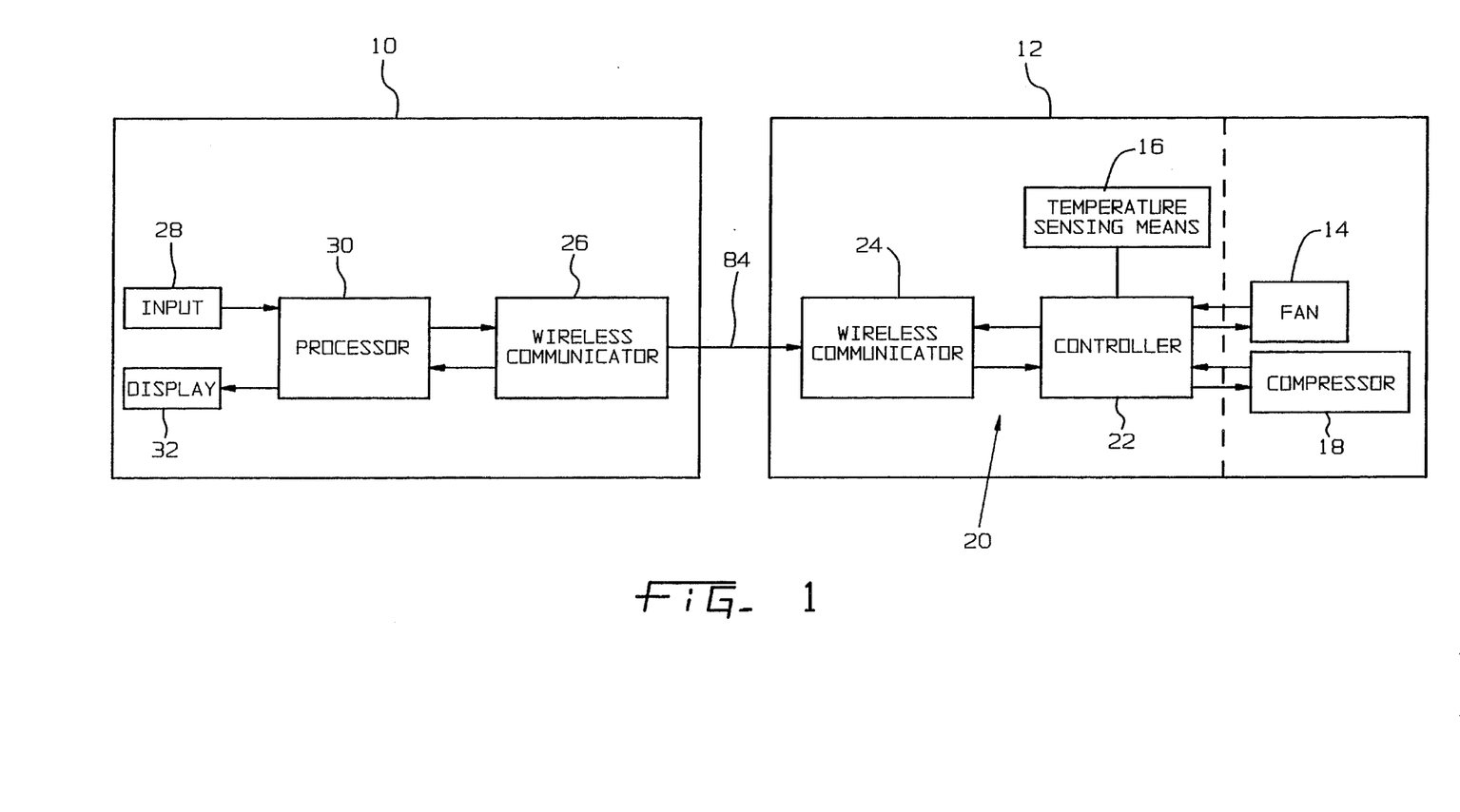
FIG. 1 is a block diagram of the remote control unit and room air conditioner of the present invention.

Referring now to the drawings and particularly to FIG. 1, there is shown a block diagram of one embodiment of the remote control unit 10 and room air conditioner 12 according to the present invention. In this embodiment, room air conditioner 12 includes a fan 14, a controller 22 and a compressor 18. Located within the room air conditioner 12 is appliance control unit 20 which includes controller means 22 operatively connected to fan 14 and compressor 18 to control the room air conditioner 12, and, more particularly, to energize, control the fan speeds, and de-energize fan 14. Controller 22 senses the temperature by temperature measuring means 16, and control the fan 14 and the compressor 18 based on the temperature read by temperature measuring means 16. A wireless communication means 24 is operatively connected to controller 22.

In this embodiment, remote control unit 10, which communicates via a wireless communication means 26 with appliance control unit 20 is adapted to be located remote from room air conditioner 12. An input means 28 is operatively connected to a processor 30 which in turn is connected to wireless communication means 26. A display means 32 is additionally connected to processor 30 so that the operational status of processor 30 may be viewed. It will be appreciated that various types of wireless communication between remote control unit 10 and appliance control unit 20 may be employed. Preferably infrared communication means are utilized. However, ultrasonic or radio frequency communication means may also be utilized for signal transmission.

Figure 3:
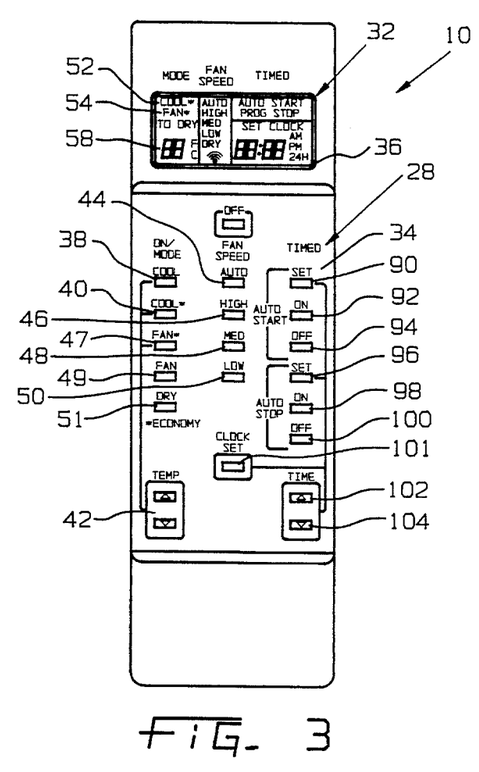
FIG. 3 is a top view of one embodiment of the selection and display means of the remote control unit.

FIG. 3 shows a top view of one embodiment of the input means 28 and display means 32 of the remote control unit 10 of FIG. 1. Remote control panel 10 includes conductive rubber key switches 34 (CRKS) having LCD display 36 centered thereon. In this embodiment, 34 conductive rubber key switches 34 include a selection means such as touch keys or switches for selecting the operational parameters of the room air conditioner, including power levels for fan 16, the unit cooling temperature, and for generating corresponding selection signals for each of the operational parameters.

Keys 38 and 40, labeled COOL and COOL*, respectively correspond to on states for room air conditioner 10 that start a current mode cooling cycle to cool the room in which the room air conditioner is located to a temperature selected by a set of temperature input keys 42.

Fan speed is controlled by keys labeled AUTO, HIGH, MED and LOW having reference numerals 44, 46, 48, and 50, respectively, for automatic, high speed, medium speed and low speed fan operations. Fan mode may be controlled by FAN, FAN*, or DRY keys 47, 49 and 51, respectively.

A clock set key 101 is utilized to allow input via time entry keys 102 and 104 to thereby set the time of day as retained within processor 30. By selecting either the time up key 102 or time down key 104, the time shown in display means 34 can be incremented or decremented.

Figure 4:
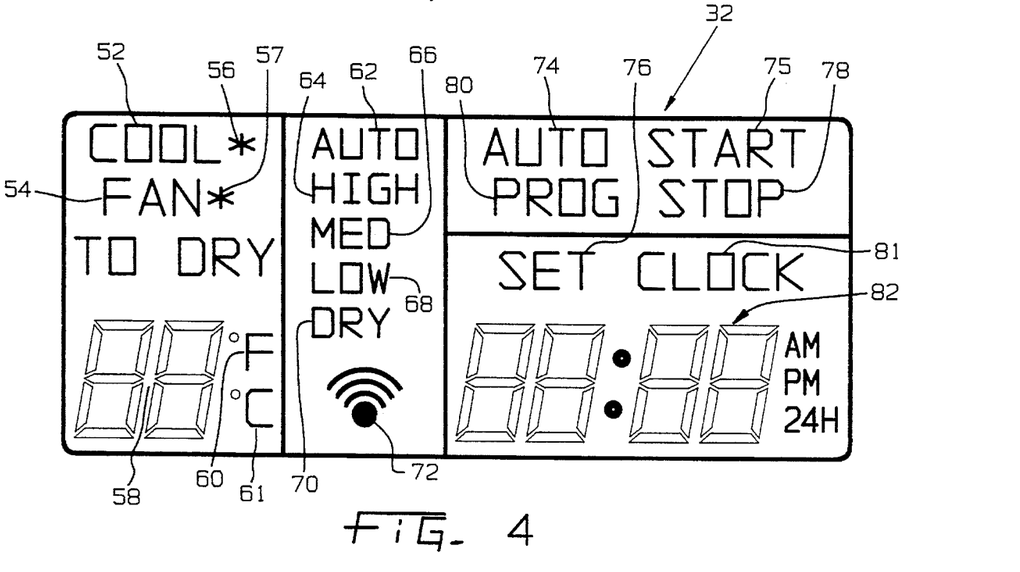
FIG. 4 is an enlarged top view of the display means.

As shown in FIG. 4, the LCD display 36 includes a plurality of display segments to provide information to the user regarding the current and delay mode settings and showing which keys have been selected on the remote control. The left side of display 36 includes segments such as COOL 52 and FAN 54 that are visible when corresponding KEYS 38, 40 or 47, 49 have been actuated. Symbols 56 and 57 are shown by LCD display 36 to indicate that an economy mode was selected via either KEYS 40 or 52. As shown, a two digit, seven segment numbered display 58 may be used to display the selected temperature. Additional segments 60 and 61 may be included to show the temperature scale utilized.

The central portion of display 32 includes segments 62–70 labeled, AUTO, HIGH, MED, LOW, and DRY corresponding to the selection used via KEYS 44, 46, 48, 50, and 51. An icon 72 is used to represent when wireless communication means 26 is transmitting.

In addition to parameter displays, such as COOL 52 or FAN 54, messages regarding the operating mode condition of the cooking appliance may be displayed on LCD display 36. Illustrated in FIG. 4 are six messages: AUTO, START, SET, STOP, PROG, and CLOCK having respective numbers 74, 75, 76, 78, 80 and 81. These messages will be explained in greater detail hereinbelow.

Figure 2:
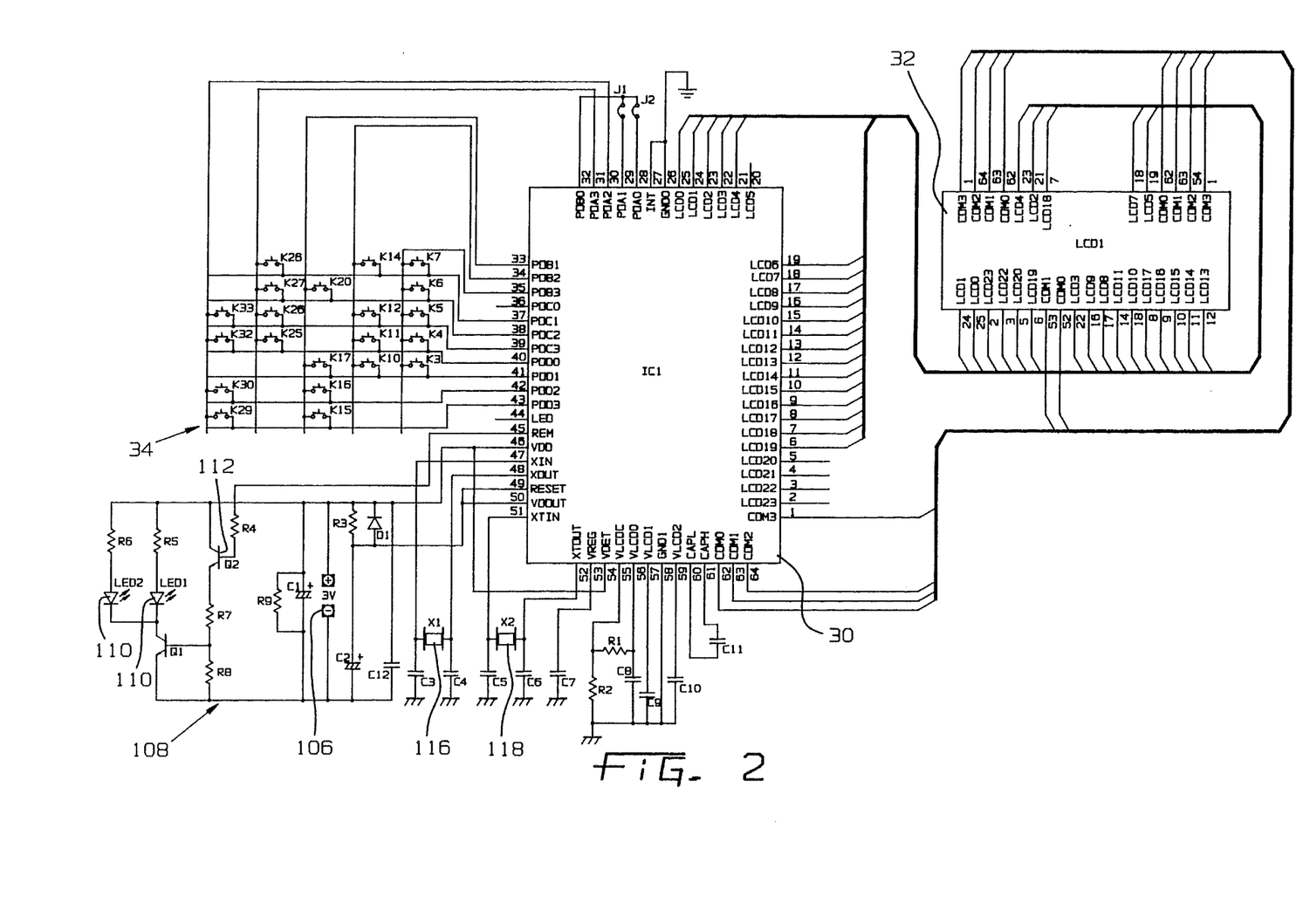
FIG. 2 is a partial schematic diagram of one embodiment of the remote control unit of the present invention.

It will be appreciated that the input means 28 and display means 32 of the present invention need not be limited to a conductive rubber key switch 34 and LCD display 36 as illustrated in FIG. 3, although the advantages of the embodiment of FIG. 2 are evident in that the surface of remote control panel 10 provides tactile feedback, ease of use, and comprises reliable components. Furthermore, LCD display 36 consumes little battery power.

Figure 5:
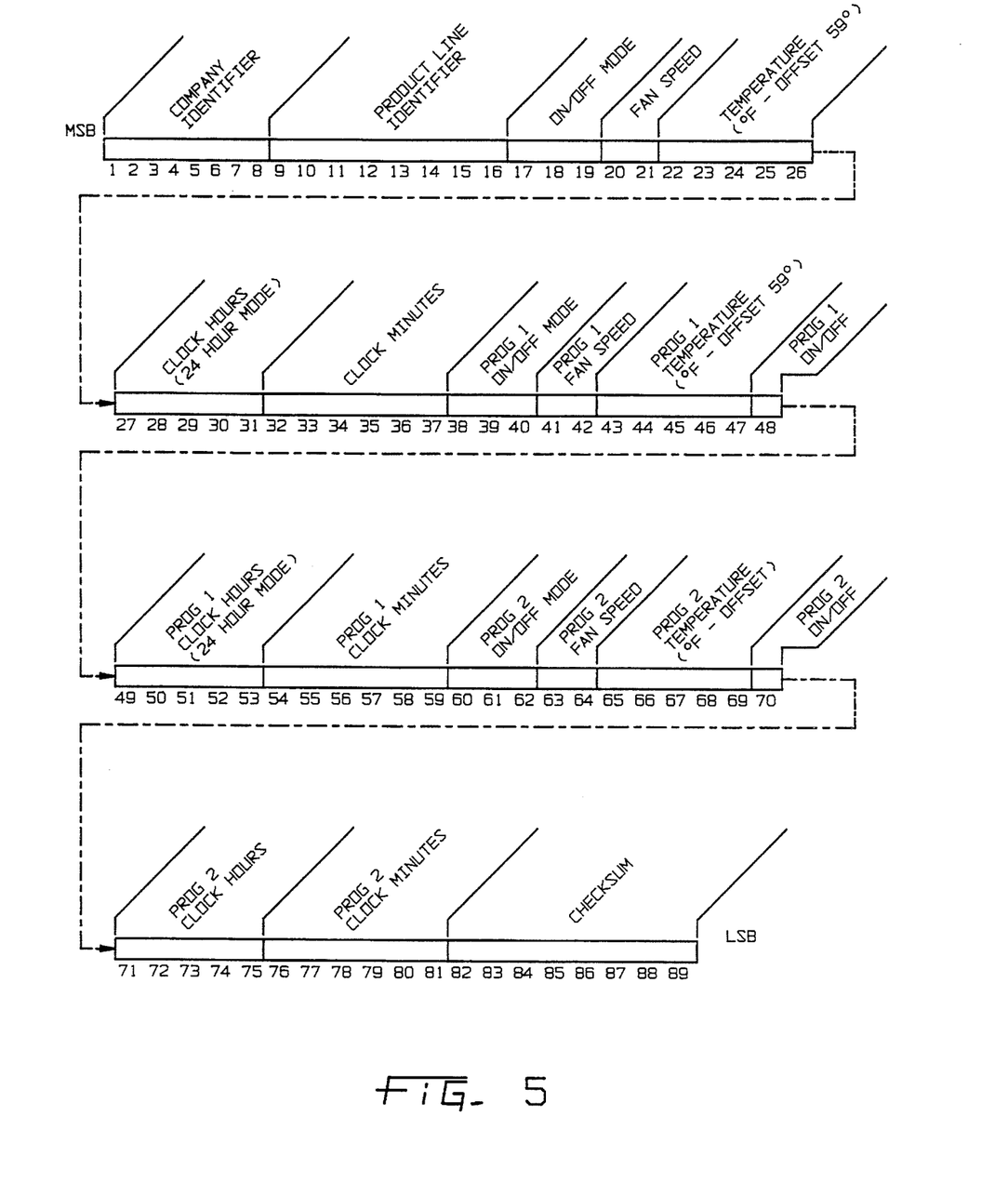
FIG. 5 is a table illustrating one embodiment of the bit coding format of the remote output signal transmitted from the remote control unit to the room air conditioner unit.

Referring again to the block diagram of FIG. 1, remote control unit 10 includes input selection means 28, such as conductive rubber key switch 34 of the embodiment of FIG. 3, for selecting the operational parameters of room air conditioner 12 and for generating selection signals. Selections received by input means 28 are provided to processor 30 which, in turn, processes such selections into a plurality of output signals 84 including a start signal, a signal identifying the manufacturer of remote control unit 10 and a signal identifying the model of remote control unit 10. Output signals 84, one embodiment of which is shown in FIG. 5, may also include a signal identifying the mode of remote control unit 10, wherein remote control unit 10 is set to command a change in the output temperature of room air conditioner 12 or program mode commands and parameters, such as discussed hereinbelow. Furthermore, remote output signal 84 may include a signal representing the desired fan speed mode of operation.

Output signals 84 are collected and then transmitted by wireless communication means 24 to switch 22 of appliance control unit 20. Operatively connected to switch means 22 are fan 14 and controller 16. Controller 22 controls, i.e., activates to a particular temperature and deactivates, compressor 18 and fan 14 based on output signals 84 received from remote control unit 10.

The present invention includes the ability to preprogram certain delayed modes of operation of the room air conditioner 12. The term AUTO START relates to the ability of the user to preprogram the room air conditioner 12 for a delayed operation cycle. AUTO STOP permits the user to preprogram the air conditioner 12 to terminate the cooling cycle at a future time.

As shown on FIG. 3, three buttons corresponding to the AUTO START mode are shown on conductive rubber key switch 34. These include the AUTO START SET Key 90, the AUTO START ON Key 92 and the AUTO START OFF Key 94. A similar set of keys are shown labeled SET 96, STOP 98 and STOP 100 for the auto stop function.

This three button control method for a delayed operation cycle (SET, ON, OFF) permits the user to enter the start time, the temperature fan speed and the operation mode of room air conditioner 12. The AUTO START key 90 initiates programming of the future cycle at which time the user enters a selected start time via time entry keys 102 and 104 along with the selected temperature via keys 42, the fan speed and operating mode. AUTO START ON key 92 enables the program cycle to begin at the preprogrammed time. The AUTO START OFF key 94 disables the preprogrammed cycle but does not remove the delay mode program from the memory of processor 30 within remote control unit 10.

The AUTO STOP cycle utilizes the AUTO STOP SET key 96 to permit the user to enter a time via time entry keys 102 and 104 at which to terminate the cooling cycle of room air conditioner 12. Similar to the AUTO START cycle, the AUTO STOP ON key 98 enables switch 22 to terminate cooling at the preprogrammed time. The AUTO STOP OFF key 100 disables automatic termination of the cooling cycle, but retains the programmed stop time in the memory of processor 30.

The output signal 84, as shown in FIG. 5, transmitted from remote control 10 to room air conditioner 12 is constructed within the data buffers of processor 30.

The process of programming an auto start function, to turn on the air conditioner and cool the room to a preset temperature at a particular time, requires first that the user select and actuate the AUTO START SET key 90. This causes processor 30 to prepare for programming a portion of the output string 84 in this embodiment from bit 38 to bit 59 as shown in FIG. 5. At this time, auto segment 74, auto start segment 75 and the set segment 76 of LCD display 36 will show in the display. At this stage, the user will then utilize time entry keys 102 and 104 to set the desired start time for room air conditioner 12. The user may then select an operating mode fan speed and temperature utilizing the button so named on conductive rubber key switch 34. After the user has selected the desired delayed program parameters, the user again selects AUTO START SET key 90 to cause processor 30 to load the selected program settings into the memory of processor 30 to be used in creating output signal 84, and in this particular embodiment, signals corresponding to bits 38 through 59.

To enable the AUTO START function, the user will select key 92, the AUTO START ON key. This will cause processor 30 to set output signal bit 48 in the embodiment shown in FIG. 5 of output signal 84. Switch means 22 of the room air conditioner 12 will identify that AUTO START has been enabled, and at the proper time, switch means 22 will actuate the proper circuit to operate the room air conditioner 12 as programmed.

AUTO START functionality is embedded in bits 38 through 59 of output signal 84 while the AUTO STOP functionality resides within bits 60 through 81 of output signal 84. To turn the AUTO START function off, the user will select the AUTO START OFF key 94. This will cause the AUTO START segment 74 in display 32 to disappear, while at the same time, processor 30 will clear bit 48 of output signal 84, to signify that the auto start parameters have been disabled. Processor 30 will not eliminate the previously programmed auto start operating parameters from bits 38 through 59 to allow the user to later utilize his preprogrammed selections by just simply selecting AUTO START ON button 92 thereby setting the enabling bit 48 of output signal 84.

The AUTO STOP function of the present invention works alone or along with the AUTO START function described above to turn off the room air conditioner 12 at a selected time of day. The procedure for programming the auto stop feature is as follows. The user first selects the AUTO STOP SET key 96. This will cause the processor 30 to prepare to load or set bits 60 through 81 of output signal 84. Further, selection of AUTO STOP SET button 96 will cause the auto segment 74 and stop segment 78 to be displayed. Additionally, the set segment 76 in display 32 will be activated.

At this stage, the user will then utilize clock set key 101 and time entry keys 102 and 104 to enter the desired stop time to processor 30. Processor 30 will then load this stop time into bits 71 through 81 into output signal 84, as shown in the embodiment of FIG. 5. The user will then select the AUTO STOP SET key 90 again to save the stop time program within processor 30. To enable the AUTO STOP program, the user will select the AUTO STOP ON key 98 to enable the program by setting on/off bit 70 at output signal 84. When AUTO STOP on/off bit 70 is enabled or set to true, then the auto stop program, i.e., program two, will be enabled or disabled. The user may turn off the auto stop feature by simply pressing the AUTO STOP off key 100. This will cause processor 30 to clear the program two on/off bit 70 and cause the auto 74 and stop 78 segments in display 32 to disappear. The AUTO STOP function is now disabled. The previous stop time within bits 71 through 81 will still be located within the memory of processor 30.

Another feature of the method is that the microprocessor 30 will compare the AUTO START program time, i.e., bits 49 through 58 of output signal 84, with those of the AUTO STOP time, i.e., bits 71 through 81 of output signal 84. If the microprocessor 30 finds that the AUTO START and STOP activation times are set to the same time, the microprocessor will automatically add five minutes to the auto stop time to prevent eliminating the possibility of a conflicting delay mode operation of room air conditioner 12.

The AUTO START/AUTO STOP functions via the respective segments of output signal 84 do not immediately affect the current operating mode of room air conditioner 12. As shown in the embodiment of output signal 84 in FIG. 5, the current operating mode of room air conditioner 12 is represented in bits 17 through 37.

Referring now to FIG. 5, there is shown a table illustrating one embodiment of the bit coding format for the remote output signal.

The first thirty seven (37) bits of the output signal are used to control the current mode of room air conditioner 12. As shown in FIG. 5, bits one through sixteen (1–16) are utilized to send a company and product line identifier so that the output signal may be made unique to a particular pair of an room air conditioner 12 and remote control 10. Bits seventeen through nineteen (17–19) are used to code the on/off mode of the air conditioner while bits twenty (20) and twenty one (21) signify the speed of fan 16. The selected temperature for output from room air conditioner 12 is encoded with bits twenty two through twenty six (22–26) as a binary code, with the range of possible combinations mapping to the operational range of room air conditioner 12. Bits twenty seven through thirty seven (27–37) of output signal 84 may represent the current time of day for a clock located on the room air conditioner 12.

In this embodiment, the selected parameters for the two program modes (i.e. AUTO START and AUTO STOP) are structured in groups of twenty-two (22) bits each, the first three (3) bits of which represent the on/off mode selected with the next two (2) bits representing the speed selected for fan 14. The next five (5) bits are used to store the selected temperature. The next bit (bit number 48 and 70 for each group) is used to determine whether the associated program is enabled. The next group of bits, bits forty nine through fifty nine (49–59) and seventy one through eighty one (71–81) are used to represent the activation time associated with either program (ie. the AUTO START time of AUTO STOP time). In this embodiment, the last eight (8) bits of the signal are used to represent a checksum for previous portions of the signal. The checksum utilized in this embodiment is the complement of the sum of the previous eighty one bits of output signal 84.

It will be appreciated that the actual codes or bit patterns used to represent the data transmitted by remote control unit 10 as illustrated in FIG. 5 are a matter of design choice.

In one embodiment of the present invention, upon depression of a key on remote control panel 10 as shown in FIG. 1, output signals 84 are transmitted intermittently to appliance control unit 12. Intermittent transmission is preferred to limit the amount of power required from such transmission. This is particularly important in view of the fact that remote control unit 10 is powered by batteries (see FIG. 5), and, therefore, battery life is extended when intermittent rather than continuous transmission is utilized. A time interval of two (2) seconds is considered appropriate for such intermittent transmissions.

It will further appreciated that the electronic remote control of the present invention provides many advantages to the consumer. Not only may a user operate the appliance from a remote location, but the remote control unit may be kept out of the reach of children. From the manufacturer's perspective, greater flexibility results in the selection of materials used for the remote control unit as the unit need not reside in at or near the room air conditioner.

Referring now to FIG. 2, there is shown a partial schematic diagram of one embodiment of the remote control unit of the present invention. Microprocessor 30 such as the UPD17202GF manufactured by NEC Corporation, is operatively connected to LCD Display 36 and to conductive rubber key switch 34 for display of messages and room air conditioner status to the user and for acceptance of user selected operational parameters. A transmitter means such as transmitter branch circuit 108 for sending signals to appliance control unit 20 from remote control unit 10 is also operatively connected to microprocessor 30. Such a transmitter 108 is simply an infrared LED diode 110 buffered with a transistor 112. Infrared transmitting LED diodes 112 should have a wide transmission pattern as the distance between remote control unit 10 and appliance control unit 20 for good transmission. A pulse-modulated carrier frequency of 38 kilohertz, such as that synthesized by microprocessor 30 in conjunction with ceramic resonator 116 (X1), of 4.19 MHZ is sufficient to drive infrared transmitter 108. A second ceramic resonator 118 is utilized to supply clock pulses to processor 30 for time keeping and display operation in sleep mode to provide long battery life.

The microfiche appendix includes computer programs written in an assembler language for use on the uPD17202 processor, although other programming languages may be used. The programs allow processor 30 to interpret and analyze signals from input means 28 and to control display means 32.

The following table shows representative values for the corresponding parts labeled in FIG. 2:

| | | |
|---|---|---|
| IC1 | Micro Computer | uPD17202AGF-XXX |
| LED1 | Infrared LED | SLR392A-1-A |
| LED2 | Infrared LED | SLR938C |
| X1 | Ceramic Resonator | 4.19 Mhz |
| X2 | Ceramic Resonator | 32.768 khz |
| Q1 | NPN Transistor | 2SD1664 |
| Q2 | NPN Transistor | 2SC2412K |
| D1 | Diode | DAP202K/DCB010-TA |
| C1 | Electrolytic Capacitor | 47 uF/6.3 V |
| C2 | Electrolytic Capacitor | 2.2 uF/50 V |
| C3–C4 | Ceramic Capacitor | 30 pF |
| C5–C6 | Ceramic Capacitor | 22 pF |
| C7–C12 | Ceramic Capacitor | 0.1 uF |
| R1 | Resistor | 840K OHM |
| R2 | Resistor | 1.2M OHM |
| R3 | Resistor | 100K OHM |
| R4 | Resistor | 100 OHM |
| R5–R6 | Resistor | 2.2 OHM |
| R7 | Resistor | 120 OHM |
| R8 | Resistor | 10K OHM |
| R9 | Resistor | 470K OHM |

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electronic control for use with a room air conditioner, comprising:

a remote control unit adapted to be located remote from said room air conditioner, said remote control unit including input means for selecting the operational parameters of said room air conditioner and for generating selection signals;

processing means for processing said selection signals into a plurality of output signals, said output signals including a delay start sequence with an encoded start time and a delay stop sequence with an encoded stop time;

memory means for maintaining in memory said delay start sequence and said delay stop sequence regardless of the operating mode of said room air conditioner; and first wireless communication means for sending said output signals; and a room air conditioner control unit including
second wireless communication means for receiving said output signals, and
switch means for controlling a said room air conditioner, said switch means operatively connected to said second wireless communication means.

2. The electronic control of claim 1 wherein said first and said second wireless communication means send and receive said output signals via an intermittent infrared beam.

3. The electronic control of claim 1 wherein said input means includes a set key, an on key and an off key, said set key enabling said processor means to load said selection signals into said memory means, said on key enabling one of said delay sequences, said off key disabling one of said delay sequences.

4. The electronic control of claim 3 wherein said input means includes a pair of said set keys, one set key enabling said processor means to load said selection signals into said delay start sequence, the other set key enabling said processor means to load said selection signals into said delay stop sequence.

5. The electronic control of claim 1 wherein said processor prevents the same encoded start time and encoded stop time from being loaded into said memory means.

6. The electronic control of claim 1 wherein said processor adds a preselected amount of time to said delay stop time if said encoded stop time is equal to said encoded start time, whereby cycling of said room air conditioner shorter than said preselected amount of time is prevented.

7. A remote control for a room air conditioner, said remote control comprising:

a processor means for creating an output signal, a display means operatively associated with said processor means for displaying operating states of said processor;

an input means operatively associated with said processor means for inputting operator selections to said processor means to control operation of a said air conditioner, said input means including a program set key, a program on key, and a program off key, said program set key enabling a user to input selected parameters into said memory means, said program on key enabling one of a start sequence and a stop sequence, said program off key disabling one of said start sequence and said stop sequence.

8. The remote control of claim 7 wherein said input means includes a pair of set keys, one said set key enabling said processor means to load said selection signals into said delay start sequence, the other said set key enabling said processor means to load said operator selections into said delay stop sequence.

9. The remote control of claim 7 wherein said processor means processes said operator selections into a plurality of output signals, said output signals comprising a delay start sequence with an encoded start time and a delay stop sequence with an encoded stop time, whereby said processor prevents the same encoded start time and encoded stop time from being loaded into said memory means.

10. The remote control of claim 7 wherein said processor means processes said operator selections into a plurality of output signals, said output signals comprising a delay start sequence with an encoded start time and a delay stop sequence with an encoded stop time, said processor means adding a preselected amount of time to said delay stop time if said encoded stop time is equal to said encoded start time, whereby unwanted short cycling of said room air conditioner is prevented.

11. A method of controlling a room air conditioner with a remote control, said remote control including a processor, an input means with a plurality of keys operatively associated with said processor, a wireless transmission means operatively associated with said processor for sending an output signal to said room air conditioner, said method comprising:

selecting a first key to signal said processor to process further selected signals into one of a delay start sequence and a delay stop sequence;

selecting further keys to input selected operational parameters including the activation time of said delay sequences into said processor;

selecting said first key again to signal said processor to cease processing further inputs into said delay sequences;

selecting a second key to cause said processor to enable said delay sequences whereby said room air conditioner is enabled to operate according to said operational parameters;

processing said inputted operational parameters into an output signal including said delay sequences; and transmitting said output signal with said wireless transmission means to said room air conditioner.

12. The method of claim 11 further including the step of selecting a third key to cause said processor to disable said delay sequence whereby said room air conditioner is prevented from operating according to said operational parameters processed in said delay sequence.

13. The method of claim 11 further including the step of repeating the previous steps to process further selection signals into the other of said delay start sequence and said delay stop sequence.

14. The method of claim 13 further including the steps of comparing said activation time of both said delay start sequence and said delay stop sequence; and altering said delay stop sequence activation time if equal to said delay start sequence activation time.

15. A method of controlling a room air conditioner with a remote control unit adapted to be located remote from said room air conditioner, said remote control unit including input means having a plurality of keys for selecting the operational parameters of said room air conditioner and for generating corresponding selection signals processing means for processing said selection signals into a plurality of output signals, said output signals including a delay start sequence with an encoded start time and a delay stop sequence with an encoded stop time, memory means for maintaining in memory said delay start sequence and said delay stop sequence regardless of the operating mode of said room air conditioner, and a wireless communication means, the method comprising:

selecting a first key in said input means to create a selection signal that enables said processor to process further selected signals into one of said delay start sequence and said delay stop sequence;

selecting further keys to input operational parameters of said room air conditioner via said selection signals to said processor;

processing said selections with said processor into a plurality of output signals;

selecting a second key to enable said one of said sequences; and transmitting said output signals with said wireless communication means to said room air conditioner.

16. The method of claim 15 further including the step of selecting a third key to disable said one of said sequences.

17. The method of claim 15 further including the step of adding a preselected amount of time to said encoded stop time if said encoded stop time equals said encoded start time.

18. The method of claim 15 further including the step of adding approximately five minutes to said encoded stop time if said encoded stop time equals said encoded start time.

* * * * *

UNITED STATES PATENT AND TRADEMARK OFFICE
CERTIFICATE OF CORRECTION

PATENT NO.  : 5,454,510
DATED       : October 3, 1995
INVENTOR(S) : Larry J. Manson et al It is certified that error appears in the above-indentified patent and that said Letters Patent is hereby corrected as shown below:

On the title page, item [57], delete "Hurner" and substitute therefor --Huener--.

Signed and Sealed this

Sixteenth Day of April, 1996

BRUCE LEHMAN

*Attest:*

*Attesting Officer*     Commissioner of Patents and Trademarks